United States Patent
Abe et al.

(10) Patent No.: US 9,925,741 B2
(45) Date of Patent: Mar. 27, 2018

(54) ACRYLIC RUBBER-METAL COMPOSITE

(75) Inventors: Katsumi Abe, Kanagawa (JP); Kiyofumi Fukasawa, Kanagawa (JP)

(73) Assignee: NOK Corporation, Tokyo (JP)

( * ) Notice: Subject to any disclaimer, the term of this patent is extended or adjusted under 35 U.S.C. 154(b) by 1238 days.

(21) Appl. No.: 12/663,310

(22) PCT Filed: May 13, 2008

(86) PCT No.: PCT/JP2008/058759
§ 371 (c)(1), (2), (4) Date: Dec. 7, 2009

(87) PCT Pub. No.: WO2008/149642
PCT Pub. Date: Dec. 11, 2008

(65) Prior Publication Data
US 2010/0285273 A1 Nov. 11, 2010

(30) Foreign Application Priority Data

Jun. 6, 2007 (JP) .................................. 2007-150403

(51) Int. Cl.

| | |
|---|---|
| *B32B 15/08* | (2006.01) |
| *B32B 3/10* | (2006.01) |
| *B32B 15/06* | (2006.01) |
| *C23C 22/08* | (2006.01) |
| *B32B 5/14* | (2006.01) |
| *B32B 7/12* | (2006.01) |
| *B32B 15/18* | (2006.01) |

(52) U.S. Cl.
CPC .............. *B32B 15/06* (2013.01); *B32B 5/147* (2013.01); *B32B 7/12* (2013.01); *B32B 15/18* (2013.01); *C23C 22/08* (2013.01); *B32B 2255/06* (2013.01); *B32B 2255/20* (2013.01); *B32B 2255/26* (2013.01); *B32B 2307/306* (2013.01); *B32B 2307/538* (2013.01); *B32B 2307/554* (2013.01); *B32B 2307/714* (2013.01); *Y10T 428/24355* (2015.01); *Y10T 428/31696* (2015.04)

(58) Field of Classification Search
CPC ........ B32B 15/08; B32B 15/082; C23C 22/08
USPC ...................... 428/411.1, 421, 457
See application file for complete search history.

(56) References Cited

U.S. PATENT DOCUMENTS

| | | | | |
|---|---|---|---|---|
| 5,182,171 A | * | 1/1993 | Aoyama et al. | ............... 428/623 |
| 5,780,147 A | * | 7/1998 | Sugahara et al. | ............. 428/332 |
| 5,962,576 A | | 10/1999 | Dehnicke et al. | |
| 2005/0215712 A1 | * | 9/2005 | Fukasawa et al. | ............. 525/133 |
| 2006/0014867 A1 | * | 1/2006 | Green et al. | .................. 524/186 |

FOREIGN PATENT DOCUMENTS

| | | |
|---|---|---|
| JP | 05-239428 | 9/1993 |
| JP | 06-073350 | 3/1994 |
| JP | 06-128541 | 5/1994 |
| JP | 10-121020 | 5/1998 |
| JP | 11-001672 | 1/1999 |
| JP | 11-277670 | 10/1999 |
| JP | 2000-017247 | 1/2000 |
| JP | 2001-073167 | 3/2001 |
| JP | 2001-277366 | 10/2001 |
| JP | 2004-352924 | 12/2004 |
| JP | 2005-220931 | 8/2005 |
| JP | 2005-226064 | 8/2005 |
| JP | 2005-256868 | 9/2005 |

OTHER PUBLICATIONS

Machine Translation of Yokota et al. (JP 2005-226064) Jan. 2004.*
Machine Translation of Shingo et al. (JP 2001-277366) Oct. 2001.*
Machine Translation of Yoshio et al. (JP-06-128541) May 1994.*
Machine Translation of Murase et al. (JP-2005-256868) Sep. 2005.*
English Translation of International Preliminary Report on Patentability (Chapter I) and Written Opinion from corresponding PCT application No. PCT/JP2008/058759 dated Dec. 17, 2009, 8 pages.

* cited by examiner

*Primary Examiner* — Callie E Shosho
*Assistant Examiner* — Patrick N English
(74) *Attorney, Agent, or Firm* — Brinks Gilson & Lione

(57) ABSTRACT

An acrylic rubber-metal composite, which comprises an iron phosphate treated iron-based metal, and an adhesive layer comprising a phenol resin and a metal oxide, and preferably further a halogenated polymer, and an acrylic rubber layer, successively provided on the iron-based metal surface, has not only distinguished initial adhesiveness and water resistance, when the acrylic rubber is bonded to the metal owing to application of the iron phosphate treatment to the metal surface, but also can reduce the abrasion of the mating materials when brought into contact with rubber-unbaked parts of the sheet, because the surface roughness Ra[according to JIS 0601(1994)] of the surface treated steel sheet is 0.6 or less.

3 Claims, No Drawings ved unbaked parts of the sheet. The present acrylic rubber-metal

ACRYLIC RUBBER-METAL COMPOSITE

RELATED APPLICATIONS

The present application is a 35 U.S.C. § 371 national stage filing of International Patent Application No. PCT/JP2008/058759, filed May 13, 2008, to which priority is claimed under 35 U.S.C. § 120 and through which priority is claimed under 35 U.S.C. § 119 to Japanese Priority Patent Application No. 2007-150403, filed Jun. 6, 2007.

TECHNICAL FIELD

The present invention relates to an acrylic rubber-metal composite, and more particularly an acrylic rubber-metal composite having a distinguished water resistance.

BACKGROUND ART

The acrylic rubber-metal composite prepared from a metal and an acrylic rubber by vulcanization bonding can be used in the production of parts requiring an oil resistance, a heat resistance, etc. Recently, a water resistance has been required in addition to the afore-mentioned characteristics in view of possible contamination of oil with water, depending on contacting service positions.

To improve chemical and physical bonding forces in the vulcanization bonding between the metal and acrylic rubber, a method for coating a zinc phosphate treated metal with a phenol resin-based adhesive is generally used. However, the zinc phosphate-based treating agent generally has a high crystallinity and the surface roughness of the metal treated with such an agent is so high as to cause a abrasion of mating materials when brought into contact with rubber-unbaked parts as a problem.

When a metal and an acrylic rubber are bonded to each other through only one layer of the adhesive without any surface treatment, on the other hand, a peeling problem occurs at the boundary surface between the metal and the adhesive in some tests of contamination of oil with water. To obtain the water resistance, it has been proposed to bond a metal to a rubber, using an undercoating adhesive and an overcoating adhesive, where the application of two layers of the adhesive has not any performance-wise problem, but a low productivity problem, because two units of adhesive applicators must be used.

Patent Document 1: JP-A-10-121020
Patent Document 2: JP-A-11-001672
Patent Document 3: JP-A-2000-017247

DISCLOSURE OF THE INVENTION

Problem to be Solved by the Invention

The object of the present invention is to provide an acrylic rubber-metal composite having not only a distinguished initial adhesiveness, but also a distinguished water resistance, by conducting a surface treatment capable of making the surface roughness of the treated metal smaller than that of the zinc phosphate treated metal, followed by bonding an acrylic rubber to the surface-treated metal.

Means for Solving the Problem

The object of the present invention can be attained by an acrylic rubber-metal composite, which comprises an iron phosphate treated iron-based metal, an adhesive layer comprising a phenol resin, a metal oxide, and preferably further a halogenated polymer, and an acrylic rubber layer, successively provided on the iron-based metal surface.

Effect of the Invention

The present acrylic rubber-metal composite is distinguished not only in the initial adhesiveness and water resistance, but also in the surface roughness of iron phosphate treated iron-based metal, which is not so large as that of zinc phosphate treated iron-based metal, by application of iron phosphate treatment to the iron-based metal surface, when bonding the acrylic rubber to the metal, where the surface roughness Ra[according to JIS 0601 (1994)] of iron phosphate treated iron-based metal is 0.6 µm or less, and thus can attain such an effect on reduction in abrasion of the mating materials when brought into contact with the rubber-unbaked parts of the sheet. The present acrylic rubber-metal composite having such effects is suitable for use as oil seals, etc.

BEST MODES FOR CARRYING OUT THE INVENTION

Iron-based metal for use in the present invention includes iron or steel, particularly steel sheet such as cold rolled steel sheets, e.g. SPCC, etc. and hot rolled steel sheets, e.g. SPHC, etc. in shapes of sheets, including rolled steel sheets, rods, etc., depending on product kinds. Generally, sheets-shaped articles can be used. In any case, the iron-based metal can be used upon applying no other surface treatment than the iron phosphate treatment.

The iron phosphate treatment can form a uniformly non-crystalline iron phosphate film on the surface of steel sheet by treating the surface of, for example, steel sheet with a solvent solution containing $NaH_2PO_4$ or $NH_4H_2PO_4$ as the main component, specifically by subjecting a defatted, water-washed steel sheet to dipping into or spraying with solvent solution at about 30° to about 45° C. for about 30 seconds to about 5 minutes, followed by water washing and drying, where the iron phosphate treating agent includes the commercially available agents, such as Parphos 1077, a product of Nihon Parkerizing Co., Surftex 6000, a product of Nippon Paint Co., etc., which can be used as such. Surface roughness Ra(according to JIS 0601 (1994) corresponding to ASTM D7127-05) of the iron phosphatized steel sheet is 0.6 µm (maximum value of the surface roughness supposedly incapable of causing an excessive abrasion of the mating materials when brought into contact with the steel sheet), or less, and thus is smaller than that of the zinc phosphate treated steel sheet.

Phenol resin for use in the adhesive of the present invention includes novolak type phenol resin or resol type phenol resin. To assure the reactivity with the acrylic rubber, it is preferable to use these two types together, and more preferable to use a blend of 50-90 wt. % of novolak type phenol resin and 50-10 wt. % of resol type phenol resin.

Novolak type phenol resin can be obtained by reaction of phenols with formaldehyde in a molar ratio of about 0.1 to about 1.0 in the presence of an acidic catalyst such as hydrochloric acid, oxalic acid, etc., whereas resol type phenol resin can be obtained by condensation reaction of a phenol with formaldehyde in a molar ratio of about 1 to about 3 in the presence of an alkaline catalyst such as ammonia, hydroxide of alkali metal or magnesium, etc. Any phenol can be used, so far as it has 2 or 3 substitutable nuclear hydrogen atoms in the o- or p-position, or both o- and p-positions relative to the phenolic hydroxyl group, and includes, for example, phenol, m-cresol, p-cresol, p-t-butyl-phenol, p-phenylphenol, bisphenol A, etc.

Metal oxide for use in the present invention as one component of the adhesive includes titanium oxide, a divalent metal oxide having an acid acceptor effect such as zinc oxide, magnesium oxide, calcium oxide, etc., mixtures of titanium oxide and divalent metal oxides, etc., where a mixture of titanium oxide and a divalent metal oxide is preferable.

The adhesive preferably further contains a halogenated polymer, including, for example, dichlorobutadiene polymer, brominated dichlorobutadiene polymer, chlorinated polychloroprene, chlorinated rubber, etc.

The adhesive for use in the present invention comprises, in terms of solid matters of the adhesive, 45-75 wt. %, preferably 55-70 wt. %, of phenol resin; 0-25 wt. %, preferably 5-25 wt. %, more preferably 8-20 wt. %, of a halogenated polymer; and 10-30 wt. %, preferably 13-29 wt. %, of a metal oxide. When the halogenated polymer is used in a proportion of more than the defined amount, the bonding to the acrylic rubber will be unsatisfactory. This is not preferable. When the metal oxide is used in a proportion of more than the defined amount, the stability of the prepared solution will be lowered and also the bonding to the acrylic rubber will be unsatisfactory, whereas in a proportion of less than the defined amount, the bonding to the acrylic rubber will be unsatisfactory. This is not preferable.

The adhesive comprising the afore-mentioned essential components can be used as a solution upon diluting the adhesive with an organic solvent so as to make a concentration of total solid matters about 3 to about 20 wt. %. Any organic solvent can be used without any special limitation, so long as it can stably dissolve or disperse the phenol resin, halogenated polymer, and metal oxide, and generally includes, for examples an alcohol such as methanol, isopropanol, etc.; a ketone such as methyl ethyl ketone, methyl isobutyl ketone, etc.; an ester such as ethyl acetate, propyl acetate, etc.; and an ether such as ethyl cellosolve, 2-ethoxyethanol, 2-butoxyethanol, etc.

The present acrylic rubber-metal composite can be prepared by applying an adhesive to the iron phosphate treated metal surface to an adhesive film thickness of about 1 to about 30 μm by any coating procedure such as spraying, dipping, brush coating, roll coating, etc., followed by drying at room temperature or with hot air, and by baking at about 100° to about 250° C. for about 0.1 to about 2 hours, thereby forming an adhesive layer, and then by bonding an acrylic rubber compound to the adhesive layer, followed by pressure vulcanization at about 180° to about 230° C. for about 2 to about 20 minutes, thereby forming an acrylic rubber layer having a thickness of about 0.5 to about 10 mm.

Unvulcanized acrylic rubber compound for use in the present invention includes compounds of acrylic rubber having any vulcanizable groups such as active chlorine groups, epoxy groups, carboxyl groups, etc. as vulcanization sites, as exemplified by the following compound formulation:

[Exemplified Acrylic Rubber Compound Formulation]

| | Parts by weight |
|---|---|
| Active chlorine group-containing acrylic rubber | 100 |
| HAF carbon black | 70 |
| Silica powder | 5 |
| Micro-crystalline wax (Sunnok, a product of | 2 |

-continued

| | Parts by weight |
|---|---|
| Ouchi-Shinko Kagaku K.K.) | |
| Stearic acid | 1 |
| 4,4'-bis(2,2'-dimethylbenzyl) diphenylamine | 2 |
| sulfur | 0.3 |
| sodium stearate | 3.5 |

The acrylic rubber having vulcanizable groups for use in the present invention includes acrylic rubber copolymers obtained by copolymerization of alkyl acrylate having an alkyl group of $C_1$-$C_8$ and/or alkoxyalkyl acrylate having an alkoxyalkylene group of $C_2$-$C_8$ as main components with about 0.1 to about 10 wt. %, preferably about 1 to about 5 wt. %, of a vulcanizable group-containing monomer, as given below:

(a) Reactive Halogen-Containing Vinyl Monomers
  2-chloroethyl vinyl ether, vinyl chloroacetate, allyl chloroacetate, or reaction products of glycidyl compounds such as glycidyl(meth)-acrylate, allyl glycidyl ester, etc. with monochloroacetic acid
(b) Epoxy Group-Containing Vinyl Monomers:
  The above-mentioned glycidyl compounds
(c) Carboxyl Group-Containing Vinyl Monomers
  (Meth)acrylic acid, maleic acid mono-lower alkyl ester, and fumaric acid mono-lower alkyl ester
(d) Hydroxyl Group-Containing Vinyl Monomers:
  2-hydroxyethyl acrylate
(e) Amido Group-Containing Vinyl Monomers
(f) Diene-Based Monomers, Etc The vulcanizing agent can be used, depending on the species of vulcanizable groups.

EXAMPLES

The present invention will be described in detail below, referring to Examples.

Examples 1 to 4, and Comparative Example 1

SPCC steel sheets were dipped into an iron phosphate treating agent (Parphos 1077) at 40° C. for 2 minutes, then washed with water, and dried at 80° C. for 5 minutes to conduct iron phosphate treatment. Surface roughness of the treated SPCC steel sheets Ra[according to JIS 0601 (1994)] was 0.08 μm.

Then, the iron phosphate treated SPCC steel sheets were coated with adhesives prepared from the components, as given below, to a thickness of 10 μm, followed by drying at room temperature and baking at 150° C. for 15 minutes. The components are given as parts by weight, where figures in parenthesis refer to weights of solid matters.

| | Example No. | | | | Comp. Ex. No. |
|---|---|---|---|---|---|
| Adhesive component | 1 | 2 | 3 | 4 | 1 |
| Novolak type phenol resin (Resitop PSF-2803, a product of Gun-ei Kasei K.K.) | 60 | 60 | 60 | 60 | 60 |
| Resol type phenol resin (Resitop PL-2208, a product of the same company, | 63.5 (40) | 63.5 (40) | 63.5 (40) | 63.5 (40) | 63.5 (40) |

-continued

| Adhesive component | Example No. 1 | 2 | 3 | 4 | Comp. Ex. No. 1 |
|---|---|---|---|---|---|
| solid matters: 63%) | | | | | |
| Chlorinated rubber | | 25 | | | |
| Zinc oxide | 20 | 20 | 10 | 25 | |
| Titanium oxide | 20 | 20 | 10 | 25 | |
| Methyl isobutyl ketone | 1236.5 | 1461.5 | 1056.5 | 1326.5 | 876.5 |

Unvulcanized acrylic rubber compound of the aforementioned compound formulation was bonded to the resulting adhesive-coated steel sheets and subjected to pressure vulcanization at 200° C. for 5 minutes, thereby forming an acrylic rubber layer having a thickness of 6 mm. The resulting acrylic rubber-metal composites as adhesion products were subjected to a 90° peeling test according to JIS K6256 corresponding to ASTM D429-03, where the initial adhesiveness and hot water resistant adhesiveness, after dipping into hot water at 80° C. for 70 hours, were determined by detecting peeled boundary sites and by measuring percent remaining rubber area.

In Examples 1 to 4, no peeled boundary sites were found between the metal sheet and the adhesive layer or between the adhesive layer and the acrylic rubber layer, when detecting the peeled boundary sites in both of the initial and after the hot water-dipping. Percent remaining rubber area was found to be 100% in both of the initial and after the hot water-dipping. Thus, it was found that both of the initial adhesiveness and hot water-resistant adhesiveness was satisfactory.

In Comparative Example 1, on the other hand, peeling took place between the acrylic rubber layer and the adhesive layer in both of the initial and after the hot water-dipping, and percent remaining rubber areas in the initial and after the hot water-dipping were found to be 95% and 90%, respectively.

Comparative Example 2

In Example 1, no iron phosphate treatment of SPCC steel sheets was conducted, where the initial percent remaining rubber area was 100%, whereas peeling took place between the metal sheet and the adhesive layer after the dipping into the hot water, and the percent remaining rubber area was found to be 0%. The surface roughness Ra of the SPCC steel sheets was 0.08 μm.

Comparative Example 3

In Example 1, zinc phosphate treated SPCC steel sheets were used in place of the iron phosphate treated ones. In the detection of peeled boundary sites in both of the initial and after the hot water dipping, no peeled boundary sites were found between the metal sheet and the adhesive layer, and also between the adhesive layer and the acrylic rubber layer, and the percent remaining rubber area was found to be 100% in both of the initial and after the hot water dipping. That is, both of the initial adhesiveness and the hot water-resistant adhesiveness was found satisfactory, though the surface roughness Ra of the zinc phosphate treated SPCC steel sheets was 1.12 μm.

The invention claimed is:

1. An acrylic rubber-metal composite, which comprises an iron phosphate treated iron-based metal, and an adhesive layer comprising 45-75 wt. % of a phenol resin and 10-30 wt. % of titanium oxide, a divalent metal oxide, or a mixture thereof, and 0-25 wt. % of a halogenated polymer, on the basis of total solids matters, and an acrylic rubber layer, successively provided on the iron-based metal surface wherein the phenol resin in the adhesive is a mixture of 50-90 wt., % of novolak type phenol resin and 50-10 wt. % of resol type phenol resin and the iron phosphate treated iron-based metal has a surface roughness Ra (according to JIS B 0601(1994)) of up to 0.6 μm inclusively.

2. An acrylic rubber-metal composite according to claim 1, wherein the halogenated polymer in the adhesive is a dichlorobutadiene polymer, a brominated dichlorobutadiene polymer, a chlorinated polychloroprene or a chlorinated rubber.

3. An oil seal made of an acrylic rubber-metal composite according to claim 1.

* * * * *